United States Patent Office 3,752,695
Patented Aug. 14, 1973

3,752,695
COATED POLYURETHANE FOAM HAVING
AN INTEGRAL SKIN
Anthony F. Finelli, Akron, Ohio, assignor to The
Goodyear Tire & Rubber Company, Akron, Ohio
Continuation of abandoned application Ser. No. 650,800,
July 3, 1967. This application Sept. 23, 1970, Ser. No.
74,855
Int. Cl. B32b 5/18, 27/40
U.S. Cl. 117—98                                    5 Claims

ABSTRACT OF THE DISCLOSURE

This invention relates to a molded polyurethane foam article which has an integral skin having the desired aesthetic and decorative effect such as simulated sewn seams. Polyurethane molded foam articles of this nature are obtained by pouring a foamable polyurethane reaction mixture into contact with a mold such as a silicone rubber, letting the foam react and cure. Since the foam will tend to discolor it is preferred to coat the skin with a coating, usually a spray coat of 2 to 6 mils of a polyurethane of a nondiscoloring type to obtain an article which is suitable for use as an interior decorative element in an automobile, for instance.

---

This is a streamline continuation of application Ser. No. 650,800, filed July 3, 1967, now abandoned.

This invention relates to a method of making a polyurethane skin which is formed having an integral skin that is of sufficient thickness to withstand abrasion and to the product thereof having a skin of the desired aesthetic characteristics. More particularly, this invention relates to a method of forming a polyurethane foam having an integral skin that has been enhanced by the application of a coat of polyurethane over the skin to enhance its abrasion and tear resistance and to give the product resistance to discoloration.

Heretofore when making polyurethane foam it has frequently been noticed that the foam so produced had a thin tissue paper skin which was not firmly adhered to the foam. This foam under abrasion tends to separate the skin and leave an unsightly foam which was not only unsightly but was inferior in that the skin was not present to protect the foam against abrasion and tearing.

The principal object of this invention is to provide a method for making polyurethane foam wherein a skin having the desired aesthetic effects is formed that is integrally and substantially adhered through the polyurethane foam and is free of the tendency to tear or abrade away as is customary with the tissue paper-thin skins of the usual molded polyurethane foams. A further object of this invention is to provide a method of making a polyurethane foam which has an integral abrasion resistant skin which has been further coated with flexible polyurethane to give the skin greater abrasion resistance and toughness wherein the foam may be said to have its own skin rather than being encapsulated in a skin after its formation.

Figure 1:
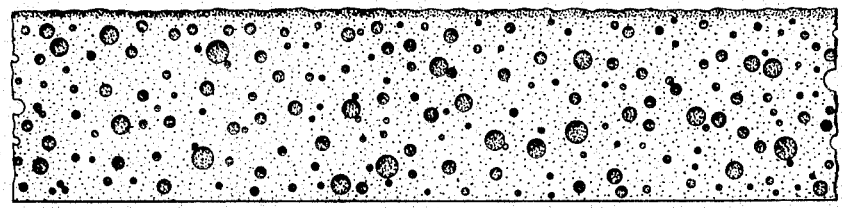
Figure 2:
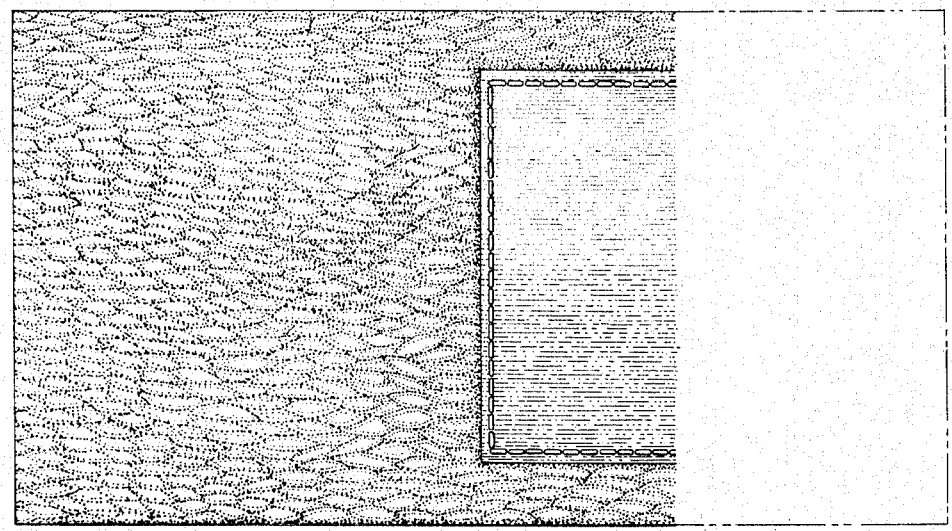

The objects and advantages of this invention may be further appreciated by reference to the drawings wherein FIG. 1 is a side elevational view of a piece of foam showing the pore cells within the foam and covered firmly ab initio with an integral skin and FIG. 2 is a top elevational view showing the decorative effect that can be formed and obtained in accordance with this invention.

The objects of this invention may be accomplished by preparing a molding surface of a suitable material and pouring the polyurethane foamable reaction mixture upon the molding surface and allowing it to react, foam and cure. Then when the polyurethane foam is stripped away from the surface, it will contain the desired skin integrally adhered to the foam. The nature of the molding surface will be described in some detail hereafter as well as the nature of the polyurethane foamable reaction mixture. To be more specific, the polyurethane molding surface is preferably a silicone rubber such as the RTV 588, RTV 589 made by Dow Corning Chemical and reacted with its activator. The polyurethane foamable reaction mixture may be any of the normal polyurethane foamable material. For instance, it may be a mixture of organic polyisocyanate, blowing agent and an organic material having active hydrogen such as the reactive hydrogen containing materials that are normally used, i.e. the polyester polyols, polyether polyols and the hydrocarbon polyols. Then these reaction products are caused to foam by reacting with water or with an auxiliary foaming agent such as the fluorohydrocarbons or methylene chloride.

The polyurethane foams produced in contact with the mold will have the surface texture and other aesthetic effects which it will obtain from the mold. Although this molded polyurethane foam article has an integral skin which is useful for some usages, this skin will tend to discolor on exposure to sunlight and upon aging. Therefore it is preferable to coat the polyurethane foam article with a coating of about 2 to 6 mils or more of a nondiscoloring polyurethane, this being achieved by spraying on a reactable polyurethane mixture of the type hereinafter described.

A specific embodiment of this invention is illustrated in the forming of an armrest by taking a silicone rubber of the reactive type and placing it over an embossed armrest such as the 1967 Ford Fairlane. Then when the armrest mold is formed by the curing of the silicone rubber, it is stripped from the armrest and then it is used as a mold when placed inside of a suitable supporting mold to form the foamed armrest by foaming and curing the polyurethane foamable mixture. The polyurethane foamable mixture may be those that are currently being used for making crash pads, for instance, a mixture of polyether polyol, toluene diisocyanate and a small amount of water and fillers. This material is poured inside the silicone mold and allowed to react and foam. Then it is stripped from the mold when it is cured to obtain an armrest having inherently formed therewith an integral foam with a skin thereon. Now this cured mold having the skin thereon is then coated with a suitable polyurethane coating mixture such as the sprayable polyurethane to build up the thickness of the coating on the skin to about 2 to 6 mils.

The following examples disclose a specific embodiment of this invention. All parts are by weight unless otherwise indicated.

EXAMPLE I

A urethane foam suitable for automotive interior padded trim is prepared by the reaction of a suitable urethane prepolymer with an activator for the foaming step. A suitable prepolymer for foaming may be prepared as follows:

|  | Parts |
|---|---|
| An adduct of 1500 molecular weight prepared by condensing propylene oxide with glycerol | 95 |
| A tetrol of 450 molecular weight prepared by condensing propylene oxide on pentaerythritol | 5 |
| 2,4/2,6-tolylene diisocyanate | 70 |
| Total | 170 |

The polyols and tolylene diisocyanate were reacted for three hours at 150° F. to a viscosity of 5,000 to 8,000 centipoises at 77° F. and an available isocyanate content of 14 to 15 percent NCO. The foam activator was prepared from the following formulation:

|  | Parts |
|---|---|
| A 500 molecular weight triol formed by condensing propylene oxide on trimethyl propane | 28.13 |
| Calcium stearate | 3.00 |
| Blocked copolymer silicone (L-520 type) | .14 |
| Black pigment | .40 |
| Trimethylolpropane | 6.20 |
| Water | 1.51 |
| Triethylene diamine | .27 |
| 1,2,4-trimethylpiperazine | .35 |
| Total | 40.00 |

The foam activator when completely mixed should show 3.5 to 4.0 percent water content. A foam was prepared by mixing 100 parts prepolymer with 40 parts activator, stirring well and then pouring the mixture into a suitable foam mold. The mold was made from a silicone rubber with a suitable embossed grain, as shown in FIG. 3. The foam is allowed to rise and fill the mold even to overflowing. Then it is permitted to cure in the molds for some twenty minutes before removal.

When a silicone rubber of the room temperature vulcanizable class (Dow Corning RTV 588, 589) is used with a suitably embossed pattern, the foam is free of imperfection on the embossed pattern surface. Indeed it possesses properties and an appearance suitable for use in many applications.

The foam slabs or shaped article with embossed surface prepared from the silicone rubber molds may be top coated to desired color and gloss level by spraying a polyurethane containing the desired color and a flatting paste to achieve the desired gloss. The sprayed urethane top coat is applied at 2 to 5 mils thickness (0.002 to 0.005 inch) depending on the embossed pattern. The top coated foam has excellent scratch and flex resistance. Topcoats in colors such as charcoal, aqua, red, brown, blue and silver show excellent resistance in Fade-Ometer. The composites are judged suitable for automotive padded trim parts such as visors, horn buttons. A posts (strut on either side of the windshield). Thus, it is possible to produce automotive interior trim products without forming and shaping the skin in a separate operation as is customary with vinyl covered crash pads and seats.

EXAMPLE II

A compounded polyurethane suitable for topcoating an embossed polyurethane foam may be prepared as follows:

A prepolymer was prepared from one mole polytetramethylene adipate (1000 molecular weight), one mole polytetramethylene adipate (2000 molecular weight), and four moles 4,4'-dicyclohexyl methane diisocyanate. The prepolymer showed an available isocyanate content of 4.2 to 4.4 percent NCO. The prepolymer was diluted to 50 percent solids with solvents such as acetone, methyl ethyl ketone, toluene and blends of such solvents.

A curative solution was prepared from 100 parts 4,4'-diaminodicyclohexylmethane and 400 parts reagent grade acetone. The acetone was added to the molten diamine. The curative solution was allowed to age for at least one hour and preferably overnight (12 to 16 hours). A sprayable urethane suitable for topcoating an embossed urethane foam was prepared according to the following recipe:

|  | Parts |
|---|---|
| Diluted prepolymer | 100 |
| Methyl isobutyl ketone/xylene (50/50) | 150 |
| Flatting paste [1] | 100 |
| Color in a vinyl/acrylic or straight acrylic lacquer binder [2] | 20 |
| Curative solution | 25 |
| Total | 395 |

[1] The flatting paste is obtained from the H. B. Davis Division, Conchemco coatings. It is a dispersion of a diatomaceous powder in the vinyl/acrylic clear lacquer. A flatting paste may also be prepared from a dispersion of Celite 281 (Johns-Manville Co.) in the diluted prepolymer. The concentration of the Celite 281 may be varied depending on the degree of gloss or flatness desired, usually about 5 to 20 percent by weight is sufficient.
[2] The pigments for the desired color are dispersed in a conventional vinyl/acrylic polymeric type lacquer using solvents such as toluene, xylene, methylethyl ketone, methylisobutyl ketone and solvent blends. A straight acrylic type polymeric lacquer may also be used for the pigment binder.

Other solvents and amounts of solvents may be used, e.g. all methyl isobutyl ketone with no xylene.

The sprayable polyurethane is sprayed on the surface of the foam of Example I to give a coating preferably 2 to 5 mils thick. However, sufficient topcoating should be applied to protect the foam and maintain the appearance of the embossed surface under the service conditions to which it is subjected.

EXAMPLE III

A polyurethane foam sample prepared as in Example I on an embossed silicone rubber mold was topcoated using the topcoating recipe shown in Example II with different colors in an acrylic type lacquer binder. The topcoated foam with embossed pattern was submitted to a Fade-Ometer test. The embossed foam without topcoating discolors badly and changes in gloss pattern after 100 hours in the Fade-Ometer and is not suitable for use as decorative elements in a car. The topcoating of the above recipes shows negligible change in gloss level or color making the composite eminently suitable for the preparation of automotive padded trim parts as shown from the results of Fade-Ometer tests in Table 1:

TABLE 1

| Type pigment used in topcoat recipe | Gloss reading | | | | |
|---|---|---|---|---|---|
|  | Initial | After 100 hrs. | After 200 hrs. | Points change | Comments |
| Dark charcoal | 5½ | 5½ |  | 0 | Excellent. |
| Dark aqua | 7 | 7 |  | 0 | Do. |
| Dark red | 6 | 6 |  | 0 | Do. |
| Dark saddle | 6 | 6 |  | 0 | Do. |
| Dark silver | 6 | 6 |  | 0 | Do. |
| Dark blue | 4¼ | 4¼ |  | 0 | Do. |
| Dark blue with stitching | 4 | 4 |  | 0 | Do. |
| Do | 5 | 4½ | 4½ | -½ | Do. |

The silicone materials useful for making molds that give the foams of this invention the desired shape and skin texture are generally thought of as being the so-called silicone gums and the liquid silicone rubbers. In the field of silicone polymers the primary emphasis is on the diorgano polysiloxane. The nature of these materials and how they may be cured are described in U.S. Pat. 3,184,427.

The silicone gum rubbers are generally prepared by curing various silicone gums. Representative of such silicone gums are poly organosiloxanes containing the recurring structural unit:

wherein R and R' represent organic radicals, usually hydrocarbon radicals. Typical substituents represented by R and R' include, for example, alkyl, alkenyl, aryl, alkaryl, aralkyl, cycloalkyl, and halogenated aryl radicals such as methyl, ethyl, vinyl, phenyl, tolyl, benzyl, cyclohexyl, and chlorophenyl radicals. Alkyl-vinyl silicone rubbers, that is, silicone rubbers in which R and R' represent alkyl and vinyl radicals, respectively, and particularly methyl-vinyl silicone rubbers containing from about 0.001 to 0.03 vinyl radicals per methyl radical are preferred.

A liquid silicone rubber containing a silanol terminated poly organosiloxane, a polyalkoxy substitued poly organosiloxane with or without salacious fillers, oils and other additives may be mixed with a suitable curing catalyst such as dibutyl tin laurate or related tin or platinum catalysts and then be cured to a silicone resin or rubber. These liquid silicone materials when incorporated with catalysts such as the tin or platinum catalysts will cure to give a rubbery or resinous polymer suitable for use as a mold material in accordance with the teachings of this invention.

Instead of making the foam material in a mold such as the silicone mold, other molds may be used providing the temperature of the mold is adjusted to permit the heat of reaction to be extracted from the surface to give a build-up of the skin in the surface area. This may be achieved by using a relatively thick mold having a high heat capacity, for instance an aluminum mold that is about one-half to one inch thick. Thus, the foam is maintained at a relatively low temperature adjacent the mold surface while the temperature is allowed to rise within the foam.

The nondiscoloring polyurethanes suitable for use in this invention are those disclosed in Ser. No. 467,115, filed June 25, 1965. These nondiscoloring urethanes may be pigmented very readily by the method described in Ser. No. 536,973, filed Mar. 24, 1966. Generally these nondiscoloring polyurethanes are a reaction product comprising (1) a reactive hydrogen containing material having a molecular weight of at least about 500 and no more than about 6000, (2) an organic polyisocyanate having all the isocyanate groups attached to nonbenzenoid carbon atoms, (3) a nonaromatic primary diamine, said polyisocyanate and said diamine being preferably so selected that the reaction between them in boiling methylene chloride of 0.2 to 0.5 molar concentration causes a turbidity inside of 30 seconds. For these polyurethane reaction mixtures to be spreadable, it is desirable that they contain a suitable inert solvent. These spreadable polyurethane reaction mixtures can be brushed, dipped, sprayed or otherwise applied to the integral skin of the foam to give it improved resistance to discoloration after 100 hours in the weatherometer as determined by ASTM method E42–57 and ASTM D–1499–59T.

The spreadability of these polyurethane reaction mixtures is best assured where the reaction mixture comprises (1) a reactive hydrogen containing material having a molecular weight of about 900 to 3000, (2) a nonaromatic organic polyisocyanate, (3) a nonaromatic primary diamine, and (4) sufficient inert solvent to render the mixture spreadable.

Preferred results are obtained when the reactive hydrogen containing material is first reacted with an organic polyisocyanate having all the isocyanate groups attached to nonbenzenoid carbon atoms and then the nonaromatic primary diamine is added to the resulting reaction product. Since the nonaromatic organic polyisocyanates and nonaromatic primary diamines utilized develop a turbidity according to the Muller hot methylene chloride test described in U.S. Pat. 2,620,516, it has been discovered that a particularly useful technique for improving and for prolonging the spreadability of the polyurethane reaction mixture is to heat the organic diamine with a ketone selected from the class consisting of acetone and methyl ethyl ketone. Thus, these ketones may be utilized as a part or all of the solvent in making polyurethane reaction mixtures which remain spreadable for a longer time.

The reactive hydrogen containing materials useful in this invention have a molecular weight of at least about 500 and no more than about 6000. Where elastomeric materials are desired, the molecular weight should be about 1000 and preferably no higher than about 3000.

Representative classes of reactive hydrogen containing materials are the polyester polyols, polyether polyols, polyether-polyester polyols, polyester amides, castor oil, polycarbonate polyols and polydiene polyols and the hydrogenated polydiene polyols.

Representative examples of these reactive hydrogen containing materials are shown in the following U.S. patent applications: Ser. No. 274,280, filed Apr. 19, 1963, Ser. No. 310,910, filed Sept. 23, 1963 and Ser. No. 410,003, filed Nov. 9, 1964. Some specific polyester diols are the alkylene adipates where the alkylene radical is ethylene, propylene, butylene, amylene and hexylene or mixtures thereof. The corresponding alkylene azelates are desired where low temperature properties are required. The (polyalkyl ether) glycols or triols are preferred where the alkyl radical is propyl or butyl.

Representative of the organic polyisocyanates having all the isocyanate groups attached to nonbenzenoid carbon atoms which are useful in this invention are:

m-xylylene diisocyanate,
4,4'-methylene bis (cyclohexyl isocyanate),
p-menthane diisocyanate,
bis(2-isocyanatoethyl) fumarate,
bis(2-isocyanatoethyl) carbonate,
bis(2-isocyanatoethyl)4-cyclohexene-1,2-dicarboxylate and
hexamethylene diisocyanate,
1-methyl cyclohexyl-2,4-diisocyanate,
1-methyl cyclohexyl-2,6-diisocyanate and
mixtures of 1-methyl-cyclohexyl 2,4-diisocyanate and 1 methyl cyclohexyl-2,6-diisocyanate.

Representative of the nonaromatic primary diamines are 1,4-cyclohexane bis(methylamine), p-menthane diamine, 1,6-hexamethylene diamine, trans-1,2-cyclobutane bis(methylamine), 1-methyl cyclohexyl-2,4-diamine, diamino cyclopentane and ethylene diamine.

Although the polyurethane reaction mixtures may be made by simultaneously mixing the reactive hydrogen containing material, the organic polyisocyanate and the diamine, it is preferred that the reactive hydrogen containing material and the organic polyisocyanate be first reacted to give a prepolymer and then the diamine be added. Also, it has been observed that about 1.3 to 3 mols of organic polyisocyanate may be used for each mol of reactive hydrogen containing material although slightly lower and higher ratios may be utilized but it has been observed that the resulting physical properties of the cured product are not as satisfactory as those obtained at the above ratios. The amount of diamines used should be about .5 to 1 mol for each mol of free isocyanate present. This is especially true where the coating and final cure of the reaction mixture is to be carried out at room temperature although it has been found that .7 to about 1.2 mols of diamine for each mol of free isocyanate may be utilized and it should be appreciated that the use of catalysts such as the well-known organic tin catalyst will affect the ratio and ultimate physical properties obtained where the reaction is carried out at room temperature or at temperatures up to about 150° C. It should be emphasized that the use of catalysts such as the organic tin catalysts have a tendency to effect the aging properties of the resulting polyurethane. Other catalysts such as the well-known tertiary amines may be utilized.

It should be emphasized that where the amount of diamine utilized is essentially equivalent to the free isocyanate that the physical properties of the cured material will usually be in the neighborhood of 4000 pounds per square inch tensile or higher whereas at the extreme ranges of diamine to free isocyanate quoted above the tensile properties may be no higher than about 1200 pounds per square inch.

While certain representative embodiments and details have been shown for the purpose of illustrating the invention, it will be apparent to those skilled in this art that various changes and modifications may be made therein without departing from the spirit or scope of the invention.

What is claimed is:

1. A composite consisting essentially of a coating of at least 2 mils of a homogeneous polyurethane on a skin of an integral polyurethane foam that tends to discolor on aging, said coating protecting the foam and skin from discoloring and preserving the desired aesthetic and design characteristics of said skin, said homogeneous polyurethane being the reaction product of a reactive hydrogen containing material having a molecular weight of about 500 to 6000 and an organic isocyanate having all the isocyanate groups attached to a nonbenzenoid carbon atom and a nonaromatic primary diamine.

2. The foam composite of claim 1 wherein the coating is 2 to 6 mils thick.

3. The composite of claim 1 wherein the nonaromatic primary amine is selected from the class consisting of 4,4'-diamino cyclohexyl methane, menthane diamine, 1-methyl cyclohexyl-2,4-diamine and diamino cyclopentane.

4. The composite of claim 1 wherein the reactive hydrogen containing material is selected from the class of polydiene polyols and hydrogenated polydiene polyols.

5. The composite of claim 1 wherein the nonaromatic primary diamine is present in a ketone solvent at the time of being mixed with the material containing an isocyanate group.

References Cited

UNITED STATES PATENTS

| | | |
|---|---|---|
| 2,955,056 | 10/1960 | Knox. |
| 2,994,110 | 8/1961 | Hardy _____ 117—138.8 X |
| 3,099,516 | 7/1963 | Henrickson _____ 264—48 |
| 3,133,978 | 5/1964 | Bartley et al. |
| 3,194,773 | 7/1965 | Hostettler. |
| 3,232,973 | 2/1966 | Bayer et al. |
| 3,249,577 | 5/1966 | Rio et al. |
| 3,401,143 | 9/1968 | Finelli et al. _____ 260—77.5 |
| 3,487,134 | 12/1969 | Burr _____ 161—160 X |

FOREIGN PATENTS

| | | |
|---|---|---|
| 254,775 | 2/1963 | Australia. |

WILLIAM D. MARTIN, Primary Examiner

S. L. CHILDS, Assistant Examiner

U.S. Cl. X.R.

117—8, 138.8 D, 161 KP; 161—160, 164; 264—Dig. 14